US012579446B2

(12) United States Patent
Patel et al.

(10) Patent No.: US 12,579,446 B2
(45) Date of Patent: Mar. 17, 2026

(54) MACHINE-LEARNING TECHNIQUES FOR RISK ASSESSMENT BASED ON CLUSTERING

(71) Applicant: EQUIFAX INC., Atlanta, GA (US)

(72) Inventors: Piyush Patel, Peachtree City, GA (US); Rajkumar Bondugula, Irving, TX (US)

(73) Assignee: EQUIFAX INC., Atlanta, GA (US)

( * ) Notice: Subject to any disclaimer, the term of this patent is extended or adjusted under 35 U.S.C. 154(b) by 790 days.

(21) Appl. No.: 18/057,147

(22) Filed: Nov. 18, 2022

(65) Prior Publication Data

US 2023/0162053 A1 May 25, 2023

Related U.S. Application Data

(60) Provisional application No. 63/264,304, filed on Nov. 19, 2021.

(51) Int. Cl.
 G06N 5/022 (2023.01)
(52) U.S. Cl.
 CPC .................................... G06N 5/022 (2013.01)
(58) Field of Classification Search
 CPC ............................... G06N 5/022; G06N 20/00
 See application file for complete search history.

(56) References Cited

U.S. PATENT DOCUMENTS

| | | | | | |
|---|---|---|---|---|---|
| 8,024,263 | B2 * | 9/2011 | Zarikian | ................ | G06Q 40/03 345/418 |
| 8,990,135 | B2 * | 3/2015 | Syed | ..................... | G06N 20/00 706/924 |
| 9,324,035 | B2 * | 4/2016 | Lee | ........................ | G16H 50/30 |
| 9,779,236 | B2 * | 10/2017 | Abrams | .............. | H04L 63/1416 |
| 10,133,980 | B2 * | 11/2018 | Turner | ................... | G06Q 40/08 |
| 10,341,430 | B1 * | 7/2019 | Badawy | .................. | H04L 63/08 |
| 10,535,009 | B2 * | 1/2020 | Turner | ..................... | G06N 3/04 |
| 10,558,913 | B1 * | 2/2020 | Turner | ................. | G06N 3/047 |
| 10,963,791 | B2 * | 3/2021 | Turner | ................. | G06Q 40/08 |
| 10,977,556 | B2 * | 4/2021 | Turner | ................. | G06N 20/00 |
| 11,227,062 | B2 * | 1/2022 | Takata | ................. | G06N 20/00 |
| 11,238,355 | B2 * | 2/2022 | Turner | ................. | G06N 3/082 |
| 11,310,257 | B2 * | 4/2022 | Argoeti | ................. | G06F 7/556 |
| 11,416,771 | B2 * | 8/2022 | Patil | ........................ | G06N 5/04 |
| 11,449,931 | B2 * | 9/2022 | Belanger | .............. | G06Q 40/03 |
| 11,468,315 | B2 * | 10/2022 | Turner | ................ | G06N 3/0985 |
| 11,475,235 | B2 * | 10/2022 | Bondugula | ........... | G06Q 40/03 |

(Continued)

*Primary Examiner* — Vinh T Lam
(74) *Attorney, Agent, or Firm* — Kilpatrick Townsend & Stockton LLP

(57) ABSTRACT

Systems and methods for predicting future risk for a target entity are provided. A risk assessment system receives historical risk assessment data of the target entity and identifies a target cluster that matches the historical risk assessment data. The target cluster is identified from a group of clusters determined using high dimensional clustering based on risk assessment data of a set of entities. The risk assessment system identifies a set of nearest neighbors of the target cluster and determines a prediction of future risk for the target entity based on the target cluster and the set of nearest neighbors. The risk assessment system transmits a responsive message, which can include the prediction of future risk, to a remote computing device for use in controlling access of the target entity to one or more interactive computing environments.

20 Claims, 8 Drawing Sheets

(56) References Cited

U.S. PATENT DOCUMENTS

| | | | | |
|---|---|---|---|---|
| 11,501,302 | B2 * | 11/2022 | Handelman | G06N 20/00 |
| 11,546,359 | B2 * | 1/2023 | Stockdale | H04L 63/1483 |
| 11,587,161 | B2 * | 2/2023 | Shiu | G06F 40/30 |
| 11,593,677 | B1 * | 2/2023 | Nagarajan | G06N 5/04 |
| 11,599,952 | B2 * | 3/2023 | Przechocki | G06Q 40/08 |
| 11,665,184 | B2 * | 5/2023 | Monteil | H04L 41/40 |
| | | | | 726/23 |
| 11,734,591 | B2 * | 8/2023 | Turner | G06N 3/09 |
| | | | | 706/44 |
| 11,824,756 | B1 * | 11/2023 | Jain | G06N 3/09 |
| 12,061,671 | B2 * | 8/2024 | Guo | G06N 3/084 |
| 12,094,615 | B2 * | 9/2024 | Subramanian | G06N 20/00 |
| 12,141,806 | B2 * | 11/2024 | Butvinik | G06N 20/20 |
| 12,175,195 | B2 * | 12/2024 | Klasson | G16H 80/00 |
| 12,198,045 | B1 * | 1/2025 | Lipke | G06N 3/08 |
| 12,225,038 | B2 * | 2/2025 | Shen | G06F 21/64 |
| 12,293,377 | B2 * | 5/2025 | Sidler | G06Q 30/0185 |
| 12,373,574 | B2 * | 7/2025 | Gjorvad | G06F 21/577 |
| 2019/0259033 | A1 * | 8/2019 | Reddy | G06N 3/08 |
| 2020/0236120 | A1 * | 7/2020 | Monteil | H04W 12/12 |
| 2021/0110294 | A1 * | 4/2021 | Elewitz | G06N 20/10 |
| 2021/0306354 | A1 * | 9/2021 | Raghuramu | H04L 67/535 |
| 2021/0357679 | A1 * | 11/2021 | Bondugula | G06N 3/082 |
| 2021/0360001 | A1 * | 11/2021 | Proper | G06V 10/762 |
| 2021/0374756 | A1 * | 12/2021 | Pandey | G06N 3/0475 |
| 2023/0153662 | A1 * | 5/2023 | Shrestha | H04L 63/1433 |
| | | | | 706/12 |
| 2025/0220019 | A1 * | 7/2025 | Madarshahian | H04L 67/535 |

* cited by examiner

MACHINE-LEARNING TECHNIQUES FOR RISK ASSESSMENT BASED ON CLUSTERING

CROSS-REFERENCE TO RELATED APPLICATION

This application claims priority to provisional application No. 63/264,304 filed Nov. 19, 2021 entitled "MACHINE-LEARNING TECHNIQUES FOR RISK ASSESSMENT BASED ON CLUSTERING," the entirety of which is incorporated by reference herein for all purposes.

TECHNICAL FIELD

The present disclosure relates generally to machine learning. More specifically, but not by way of limitation, this disclosure relates to employing machine learning techniques for generating outputs (e.g., risk assessments) based on clustering operations.

BACKGROUND

In machine learning, various models have been used to perform functions such as providing a prediction of an outcome based on input values. These models can provide predictions, but may not be configured to facilitate risk assessment operations. Risk assessment can involve determining whether a request made by a requesting entity, or the requesting entity itself, is a risk to a provider entity. Risk can involve negative consequences for the provider entity. For example, if the request or the requesting entity is characterized by high risk, the provider entity may unintentionally facilitate an unauthorized interaction, may lose access to various resources, or the like.

SUMMARY

Various aspects of the present disclosure provide systems and methods for predicting future risk assessment values for a target entity. Historical risk assessment data of a target entity can be received. A target cluster out of a set of clusters can be identified. The target cluster can match the historical risk assessment data of the target entity, and the set of clusters can be determined based on risk assessment data of entities using high dimensional clustering. A set of nearest neighboring clusters can be identified from the set of clusters. A prediction of risk for the target entity can be determined based on the target cluster and the set of nearest neighboring clusters. A responsive message including at least the prediction of risk can be transmitted for use in controlling access of the target entity to one or more interactive computing environments.

In other aspects, a system can include a processor and a non-transitory computer-readable medium that can include instructions that are executable by the processor to cause the processor to perform various operations. The system can receive historical risk assessment data of a target entity. The system can identify a target cluster out of a set of clusters. The target cluster can match the historical risk assessment data of the target entity, and the plurality of clusters can be determined based on risk assessment data of entities using high dimensional clustering. The system can identify, from the set of clusters, a set of nearest neighboring clusters of the target cluster. The system can determine a prediction of risk for the target entity based on the target cluster and the set of nearest neighboring clusters. The system can transmit, to a remote computing device, a responsive message including at least the prediction of risk for use in controlling access of the target entity to one or more interactive computing environments.

In other aspects, a non-transitory computer-readable medium can include instructions that are executable by a processing device for causing the processing device to perform various operations. The operations can include receiving historical risk assessment data of a target entity. The operations can include identifying a target cluster out of a set of clusters. The target cluster can match the historical risk assessment data of the target entity, and the set of clusters can be determined based on risk assessment data of entities using high dimensional clustering. The operations can include identifying, from the set of clusters, a set of nearest neighboring clusters of the target cluster. The operations can include determining a prediction of risk for the target entity based on the target cluster and the set of nearest neighboring clusters. The operations can include transmitting, to a remote computing device, a responsive message including at least the prediction of risk for use in controlling access of the target entity to one or more interactive computing environments.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
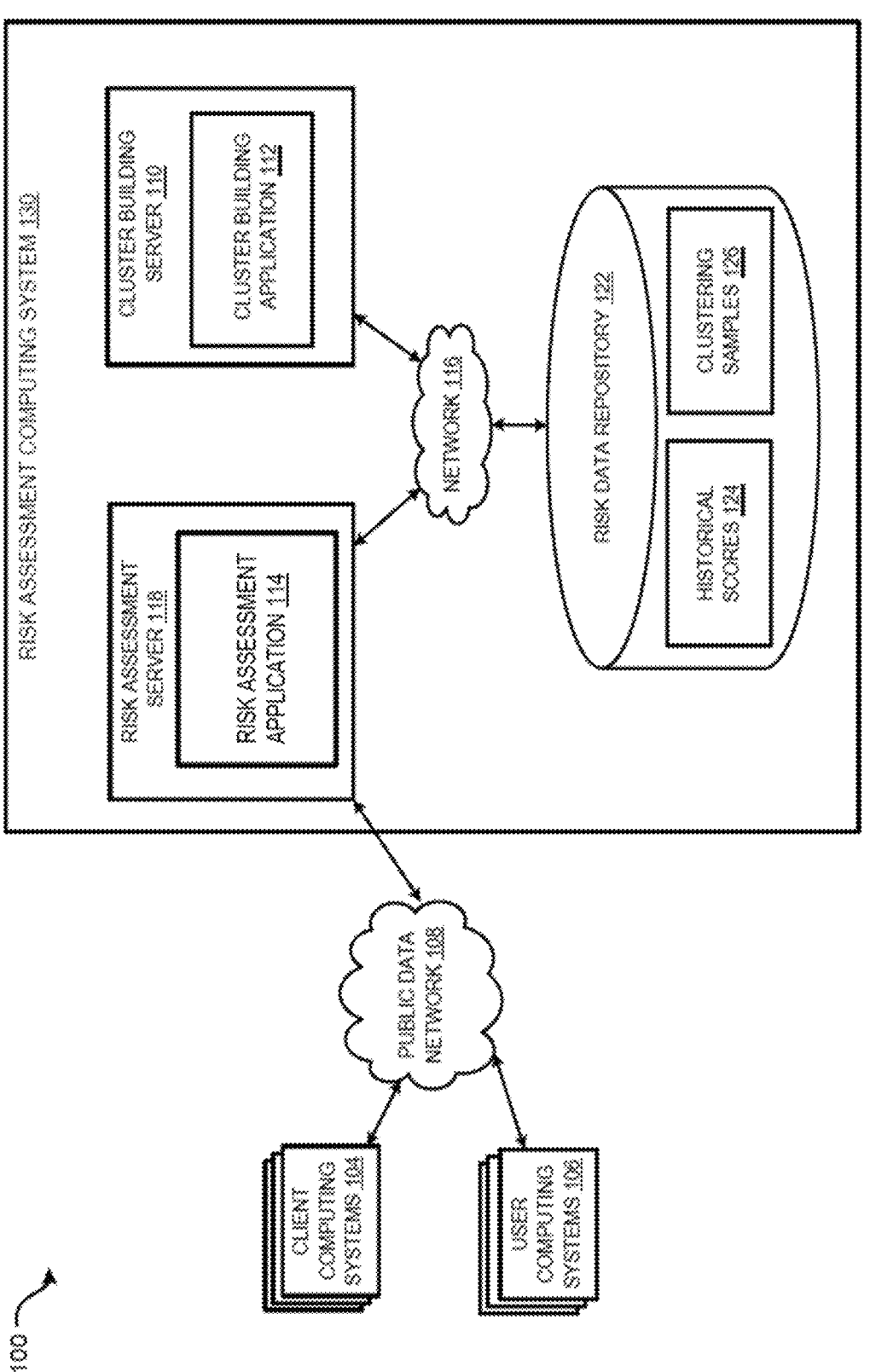
FIG. 1 is a block diagram depicting an example of an operating environment in which a risk assessment computing system can be utilized to predict future risk assessment values of an entity based on clustering techniques according to certain aspects of the present disclosure.

Machine learning techniques can be used to output various information. For example, a machine-learning model can output risk assessment values (e.g., risk scores) with respect to one or more entities. These risk assessment values can be used for making decisions about the entities. But, the risk assessment values may not be accurate for facilitating decisions regarding access control.

Certain aspects and features of the present disclosure that use a machine-learning model with clustering operations can address one or more issues identified above. For example, by using clustering operations, the machine-learning model can predict future risk assessment values, such as risk scores associated with an entity accessing an online computing environment and the like, for an entity (e.g., a computer, a mobile phone, a tablet connected to the network, or an individual or an organization). The clustering operations can include or otherwise involve high dimensional clustering or other suitable clustering operations. Clusters generated or identified by the clustering operations can be used to accurately predict future risk assessment values for the entity. For example, a target cluster, nearest neighbors of the target cluster, or micro paths thereof can be used to predict the future risk assessment values. The target cluster can include a cluster that may include a trend or behavior similar or identical to the historical risk assessment data of the entity. The target cluster can be corresponded to the entity by using one or more distance metrics or other suitable techniques. A computing system can predict the future risk assessment values using a middle or average path of the target cluster (or a nearest neighbor cluster or a micro path thereof) or by applying a ratio between the historical risk assessment values and a most-recent risk assessment data point of the target cluster to the historical risk assessment values of the entity.

In some examples, the computing system can predict the future risk assessment values or scores using one or more autoregressive models (e.g., models that can predict future trends based on past trends, etc.). The autoregressive models can be generated, for example, by the computing device for each cluster generated or identified by the clustering operation or any subset thereof. The computing device can use records or other data associated with a cluster to generate an autoregressive model for the cluster. The computing device can use the autoregressive model of the cluster to predict a future risk assessment value of the entity with respect to the cluster. The computing device can generate an autoregressive model for each of the generated or identified clusters and can predict a future risk assessment value for the entity with respect to each of the clusters using the respective autoregressive model.

As described herein, certain aspects provide improvements to controlling access to computing resources. For example, the prediction of future risk can be used by a risk assessment system to more accurately and efficiently control access to computing resources such as an interactive computing environment that can provide computing resources, such as computational processing power, computer memory, and the like, to the target entity. In particular, clustering techniques can be used by the risk assessment system to more accurately (e.g., compared to systems using other techniques) predict a future risk assessment value. Based on this prediction, the risk assessment system can more accurately control access to the computing resources. For example, if the prediction of future risk is high, the risk assessment system may not provide access to the computing resources, and if the prediction of future risk is low, the risk assessment system may provide access to the computing resources. Compared with other machine learning techniques, such as neural networks, using the clustering requires fewer computing resources (e.g., CPU times) and storage resource (e.g., memory usage).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Multi-Stage Machine-Learning Operations

Referring now to the drawings, FIG. 1 is a block diagram depicting an example of an operating environment 100 in which a risk assessment computing system 130 can be utilized to predict future risk assessment values of an entity based on clustering techniques. FIG. 1 depicts examples of hardware components of a risk assessment computing system 130, according to some aspects. The risk assessment computing system 130 can be a specialized computing system that may be used for processing large amounts of data using a large number of computer processing cycles. The risk assessment computing system 130 can include a cluster building server 110 for building a set of clusters. The risk assessment computing system 130 can further include a risk assessment server 118 for performing a risk assessment (e.g., predicting future risk of the entity) for a target entity (e.g., a target individual) using the clusters determined by the cluster building server 110.

The cluster building server 110 can include one or more processing devices that can execute program code, such as a cluster building application 112. The program code can be stored on a non-transitory computer-readable medium or other suitable medium. The cluster building application 112 can execute one or more processes to perform clustering operations (e.g., involving high dimensional clustering or other suitable clustering operations) for generating a set of clusters associated with risk assessment data. In some aspects, the cluster building application 112 can build the set of clusters utilizing clustering samples 126, which can include risk assessment data or other suitable data for clustering samples. The clustering samples 126 can be stored in one or more network-attached storage units on which various repositories, databases, or other structures are stored. Examples of these data structures can include the risk data repository 122.

Network-attached storage units may store a variety of different types of data organized in a variety of different ways and from a variety of different sources. For example, the network-attached storage unit may include storage other than primary storage located within the cluster building server 110 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory, memory devices, or other suitable media.

The risk assessment server 118 can include one or more processing devices that can execute program code, such as a risk assessment application 114. The program code can be stored on a non-transitory computer-readable medium. The risk assessment application 114 can be used to predict future risk for the entity or to perform other suitable operations. The predicted risk can be utilized to make decisions about the entity. For example, the predicted risk of the entity can be used to determine whether a risk associated with granting the entity access to resources is high, for example, higher than a threshold risk value. If the risk is high, the entity may be denied access to the resources. For instance, the risk may be related to the credit score of the entity and if the predicted credit score is too low (thus the risk is high), then the entity may be denied a financial loan. In another example, the resource may be cloud computing resources (e.g., online virtual machine instances) or online storage resources. The risk assessment server 118 can use clusters determined based on risk scores associated with different entities accessing the online resources to predict the risk for a given target entity. Depending on the predicted risk, the target entity may be granted or denied access to these online resources.

In some examples, the risk assessment computing system 130 can determine the future risk for the entity (e.g., via the risk assessment server 118) by using the historical scores 124 and the clustering samples 126. The historical scores 124 can include historical risk assessments or risk indicators (e.g., credit scores, etc.). The historical scores 124 can include risk indicators associated with a group of entities at N time points, such as N months or quarters, where N>M in which M can be a number of data or time points used to determine the clustering samples 126. The clustering samples 126 can be used to generate a set of clusters by the risk assessment computing system 130 or other suitable computing systems or devices. The set of clusters can be generated using one or more clustering operations based on the historical scores 124 and other suitable information (e.g., more recent scores, etc.). By using the clustering samples 126 and historical scores 124, the risk assessment computing system 130 can more efficiently and accurately predict the future risk of the entity.

Furthermore, the risk assessment computing system 130 can communicate with various other computing systems, such as client computing systems 104. For example, client computing systems 104 may send risk assessment queries to the risk assessment server 118 for performing risk assessment operations, or may send signals to the risk assessment server 118 that control or otherwise influence different aspects of the risk assessment computing system 130. The client computing systems 104 may also interact with user computing systems 106 via one or more public data networks 108 to facilitate interactions between users of the user computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by a suitable provider of products or services. The client computing system 104 can include one or more server devices. The one or more server devices can include or can otherwise access one or more non-transitory computer-readable media. The client computing system 104 can also execute instructions that provide an interactive computing environment accessible to user computing systems 106. Examples of the interactive computing environment include a mobile application specific to a particular client computing system 104, a web-based application accessible via a mobile device, etc. The executable instructions can be stored in one or more non-transitory computer-readable media.

The client computing system 104 can further include one or more processing devices that can be capable of providing the interactive computing environment to perform operations described herein. The interactive computing environment can include executable instructions stored in one or more non-transitory computer-readable media. The instructions providing the interactive computing environment can configure one or more processing devices to perform operations described herein. In some aspects, the executable instructions for the interactive computing environment can include instructions that provide one or more graphical interfaces. The graphical interfaces can be used by a user computing system 106 to access various functions of the interactive computing environment. For instance, the interactive computing environment may transmit data to and receive data from a user computing system 106 to shift between different states of the interactive computing environment, where the different states allow one or more electronics transactions between the user computing system 106 and the client computing system 104 to be performed.

In some examples, a client computing system 104 may have other computing resources associated therewith (not shown in FIG. 1), such as server computers hosting and managing virtual machine instances for providing cloud computing services, server computers hosting and managing online storage resources for users, server computers for providing database services, and others. The interaction between the user computing system 106 and the client computing system 104 may be performed through graphical user interfaces presented by the client computing system 104 to the user computing system 106, or through an application programming interface (API) calls or web service calls, or through other suitable techniques.

A user computing system 106 can include any computing device or other communication device operated by a user or entity, such as a user of products or services provided by the provider. The user computing system 106 can include one or more computing devices, such as laptops, smartphones, and other personal computing devices. A user computing system 106 can include executable instructions stored in one or more non-transitory computer-readable media. The user computing system 106 can also include one or more processing devices that are capable of executing program code to perform operations described herein. In various examples, the user computing system 106 can allow a user to access certain online services from a client computing system 104 or other computing resources, to engage in mobile commerce with a client computing system 104, to obtain controlled access to electronic content hosted by the client computing system 104, etc.

For instance, the user can use the user computing system 106 to engage in an electronic interaction with a client computing system 104 via an interactive computing environment. An electronic interaction between the user computing system 106 and the client computing system 104 can include, for example, the user computing system 106 being used to request online storage resources managed by the client computing system 104, acquire cloud computing resources (e.g., virtual machine instances), request approval for a financial loan, and so on. An electronic interaction between the user computing system 106 and the client computing system 104 can also include, for example, querying a set of sensitive or other controlled data, access online financial services provided via the interactive computing environment, submitting an online credit card application or other digital application to the client computing system 104 via the interactive computing environment, operating an electronic tool within an interactive computing environment hosted by the client computing system (e.g., a content-modification feature, an application-processing feature, etc.), and the like.

In some aspects, an interactive computing environment implemented through a client computing system 104 can be used to provide access to various online functions. As a simplified example, a website or other interactive computing environment provided by an online resource provider can include electronic functions for requesting computing resources, online storage resources, network resources, database resources, or other types of resources. In another example, a website or other interactive computing environment provided by a financial institution can include electronic functions for obtaining one or more financial services, such as loan application and management tools, credit card application and transaction management workflows, electronic fund transfers, etc. A user computing system 106 can be used to request access to the interactive computing environment provided by the client computing system 104, which can selectively grant or deny access to various electronic functions. Based on the request, the client computing system 104 can collect data associated with the user and communicate with the risk assessment server 118 for risk assessment. Based on the risk indicator predicted by the risk assessment server 118, the client computing system 104 can determine whether to grant the access request of the user computing system 106 to certain features of the interactive computing environment.

In a simplified example, the system depicted in FIG. 1 can be configured to accurately predict risk indicators, such as credit scores, or risk scores associated with accessing an online computing environment, using a set of clusters. A cluster can include a set of historical risk indicators, which can be associated with various entities, that can follow a similar trend. For example, the cluster can include a set of risk scores that have increased or decreased by similar margins. The risk assessment application 114 can choose, for an entity, a target cluster from the set of clusters based on historical risk indicators of the entity and use the target cluster to accurately predict future risk indicators for the entity.

In some examples, the predicted future risk indicator can be utilized by the service provider to determine the risk associated with the entity accessing a service provided by the service provider, thereby granting or denying access by the entity to an interactive computing environment implementing the service. For example, if the service provider determines that the predicted future risk indicator is lower than a threshold risk indicator value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials or the dedicated web address, the user computing system 106 can establish a secure network connection to the computing environment hosted by the client computing system 104 and access the resources via invoking API calls, web service calls, HTTP requests, or other proper mechanisms.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 is provided for illustrative purposes. Different numbers and types of devices may be used. For example, while certain devices or systems are shown as single devices in FIG. 1, multiple devices may instead be used to implement these devices or systems. Similarly, devices or systems that are shown as separate, such as the cluster building server 110 and the risk assessment server 118, may be instead implemented in a signal device or system.

Techniques for Predicting Future Risk Indicators Using Clustering

Figure 2:
FIG. 2 is a flow chart depicting an example of a process for predicting future risk indicators through clustering according to certain aspects of the present disclosure.
Figure 2:
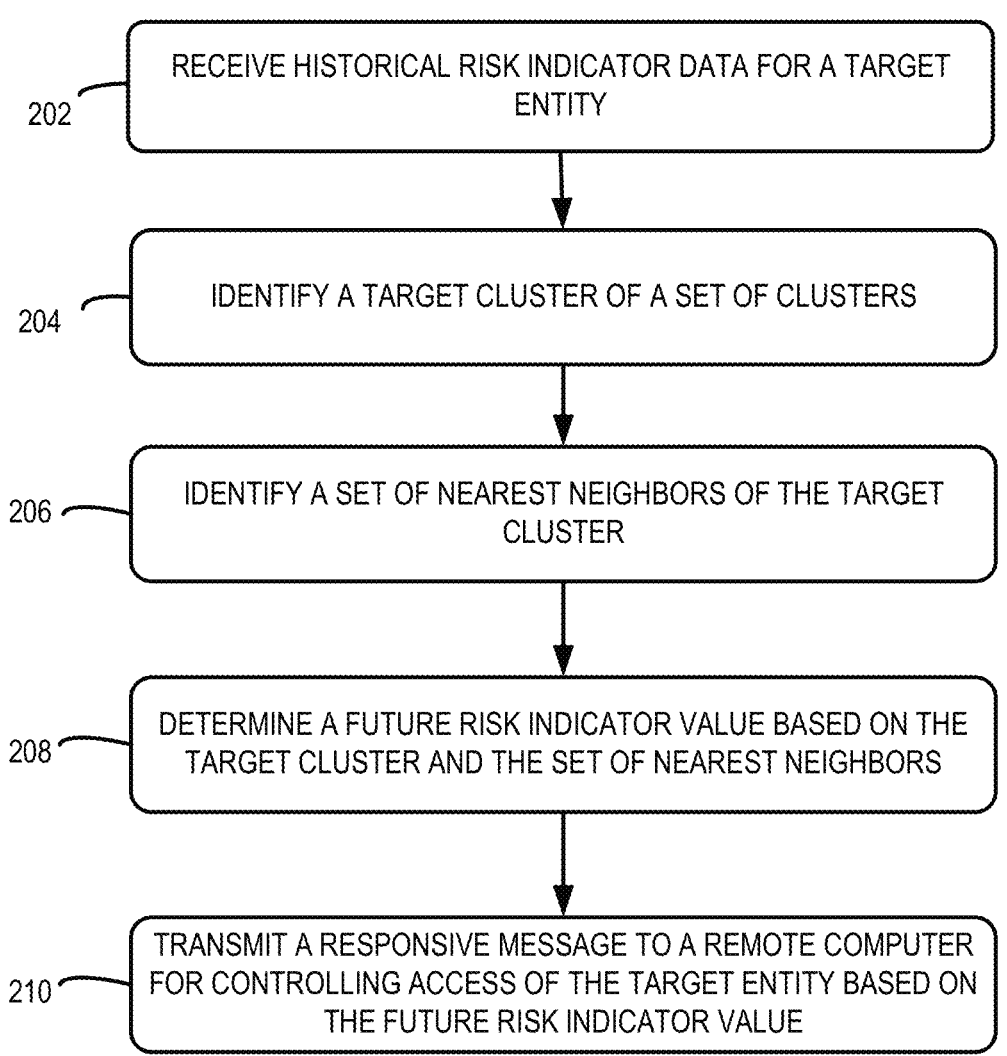

FIG. 2 is a flow chart depicting an example of a process 200 for predicting future risk indicators by using one or more clustering operations according to certain aspects of the present disclosure. At block 202, the process 200 involves receiving historical risk indicator data of a target entity. In some examples, entities can include individuals such as consumers, customers, companies, organizations or other types of entities or computing systems or devices such as laptops, desktops, smart phones, tablets, server computers and so on. The historical risk indicator data can include historical risk indicators, such as credit scores, risk scores, or other suitable risk assessment values, associated with the target entity for the past M time points, such as past M months, quarters, years, or the like.

At block 204, the process 200 involves identifying a target cluster for the target entity from a set of clusters. The target cluster may be a cluster that is characterized by a trend that most closely matches, compared to other clusters, a trend of the historical risk indicator data of the target entity. For example, data points of the target cluster may be similar to data points of the historical risk assessment data of the target entity. In other examples, an increase in the data points or a decrease in the data points over a finite time period, such as M months or data points, for the target cluster can be similar to an increase in the historical risk assessment data or a decrease in the historical risk assessment data of the target entity over the finite time period.

Clustering techniques can be used to determine the set of clusters based on the historical risk assessment data. In some examples, high dimensional clustering can be used to determine the set of clusters based on risk indicator data. The high dimensional clustering may involve a modified bisecting K-means algorithm and includes multiple iterations with each iteration splitting a cluster into two according to a splitting criterion. The splitting criterion can be configured to select the largest cluster (i.e., containing the largest number of data points) or the widest cluster among the existing clusters for splitting. The width of a cluster can be measured by the radius of the cluster and the cluster having the largest radius is the widest cluster. The process may continue until certain termination conditions are satisfied. The termination conditions can include, for example, a maximum number of iterations has been reached, a maximum number of clusters has been generated, or the clusters have, at most, a predetermined number of samples. Additional details about the high dimensional clustering are provided in U.S. patent application Ser. No. 16/875,658 filed May 15, 2020, the entirety of which is hereby incorporated by reference.

The set of clusters can include any suitable number, such as one, two, three, four, or more, of clusters. Clusters of the set of clusters can each include a subset of risk indicator data. In some examples, each cluster may not include equal amounts of data. In other examples, some risk indicator data may be omitted during the clustering. For example, more recent risk indicator data may be omitted, and instead used for prediction or for other suitable functions or operations, and less recent risk indicator data may be used in the clustering operations. The risk indicator data can include risk indicators associated with a group of entities at N time points, such as N months or quarters, where $N>M$. In some examples, the risk indicators can include credit scores for the respective entities. Additionally or alternatively, the entities can include consumers, and the risk assessment data can include credit scores or other suitable risk assessments or indicators corresponding to each of the consumers.

The risk assessment computing system 130 can build the clusters based on similar behaviors in the risk assessment data. For example, each cluster may include risk assessment data from a subset of the plurality of entities that may be similar or identical such that the risk assessment data of each cluster may indicate a similar or identical trend, etc. The clusters can be grouped by trend, for example increasing, decreasing, stable, etc. In some examples, the clusters can be generated by determining the percentiles of the risk assessment data. For example, the risk assessment computing system 130 can generate 101 percentile clusters that each represent an approximate magnitude of respective percentiles such as a first percentile cluster, a second percentile cluster, etc. Any suitable number of clusters can be generated or identified using high dimensional clustering, percentile clustering, or other suitable clustering techniques.

In some examples, a subset of the historical risk assessment data of the entity, a subset of the risk assessment data of the target cluster, or some combination thereof can be used by the risk assessment computing system 130 to correspond the target cluster to the entity. The risk assessment computing system 130 can use one or more distance metrics to assign or identify a target cluster that corresponds to the entity. For example, a distance metric can be calculated between the entity and each of the clusters and the cluster having the smallest distance can be identified as the target cluster that matches the historical risk indicator data of the entity. The distance can be calculated between the historical risk indicator data of the entity and the corresponding risk indicator data of the cluster. For instance, if the cluster is represented by a center path containing average risk indicators at different time points, the distance will be calculated between the historical risk indicator data of the entity and the center path of the cluster. Some examples of distance metrics can include Euclidean distance, Manhattan distance, Minkowski distance, Hamming distance, other distance metrics, or a combination thereof.

At block 206, the process 200 involves identifying a set of nearest neighbors of the target cluster. In some examples, the set of nearest neighbors can include six nearest neighbors, for example three nearest neighbor clusters above or otherwise a first distance from the target cluster and three nearest neighbor clusters below or otherwise a second distance from the target cluster, but the set of nearest neighbors can include other suitable numbers (e.g., more than three or less than three) of nearest neighbor clusters. Any suitable nearest neighbor algorithm can be used to identify the nearest neighbors of the target cluster.

At block 208, the process 200 involves determining a future risk indicator associated with the target entity. The future risk indicator can include a future or predicted credit score, risk score for accessing computing resources, or other suitable risk indicator of the target entity. A computing system, such as the risk assessment computing system 130, can search among the target cluster and the nearest neighbors of the target cluster to identify the best-matched path for determining the future risk indicator. For example, the computing system can determine a trend of risk assessment that the entity is most likely to follow using the target cluster and the nearest neighbors. The trend may include the trend of the target cluster, the trend of one or more nearest neighbor clusters, or a combination thereof. For example, the computing system can identify micro paths within each of the target clusters and the nearest neighbors and determine the micro path among these collections of micro paths that has the smallest distance to the risk indicator data of the entity. The micro paths may be characterized by a similar or identical trend compared with the corresponding cluster and may be characterized by different magnitudes. In some examples, the micro path can include percentile paths. An X percentile path can be created by connecting the risk indicator values at the X percentile of the population in the cluster at different time points. X can take values from 0 to 100, and thus, there can be 101 percentile paths. The identified closest micro path can be utilized to predict the future risk indicator of the target entity.

In some examples, each path in the clusters may include N data points corresponding to N time points. The risk indicator data for the entity can include M data points corresponding to the past M time points and $M<N$. In the above-described process, identifying the closest path can be based on M data points of each path, for example the earliest M data points. As a result, the remaining N–M data points in the identified closest path can be utilized as the prediction of the future N–M risk indicators for the target entity at the future N–M time points.

In another example, an average, such as a mean value, or a middle, such as a median value or a $50^{th}$ percentile value, of the target cluster, of one of the nearest neighbors, or of one of the micro paths can be used to predict the future risk indicator value. In another example, a ratio between a first dataset, such as the historical risk indicator data points, and a second dataset, such as data points of the target cluster, a nearest neighbor cluster, or a micro path thereof, can be used to determine the future risk indicator value. In further examples, the computing system can use the center path of the target cluster, instead of the closest micro path, to predict the future risk indicators for the target entity. The computing system can use other suitable techniques to predict the future risk indicators for the target entity.

At block 210, the process 200 involves outputting the predicted future risk indicator value for making one or more decisions. For example, the predicted future risk indicator value can be used to grant or deny access to the target entity for various functions or services in an interactive computing environment such as the interactive computing environment described with respect to FIG. 1. In another example, the predicted future risk indicator value can be used to grant or deny a credit or financial application, for example for acquiring credit or a loan. The computing system can use the output predicted future risk indicator value to make other suitable decisions relating to the target entity.

Examples of Clusters

Figure 3:
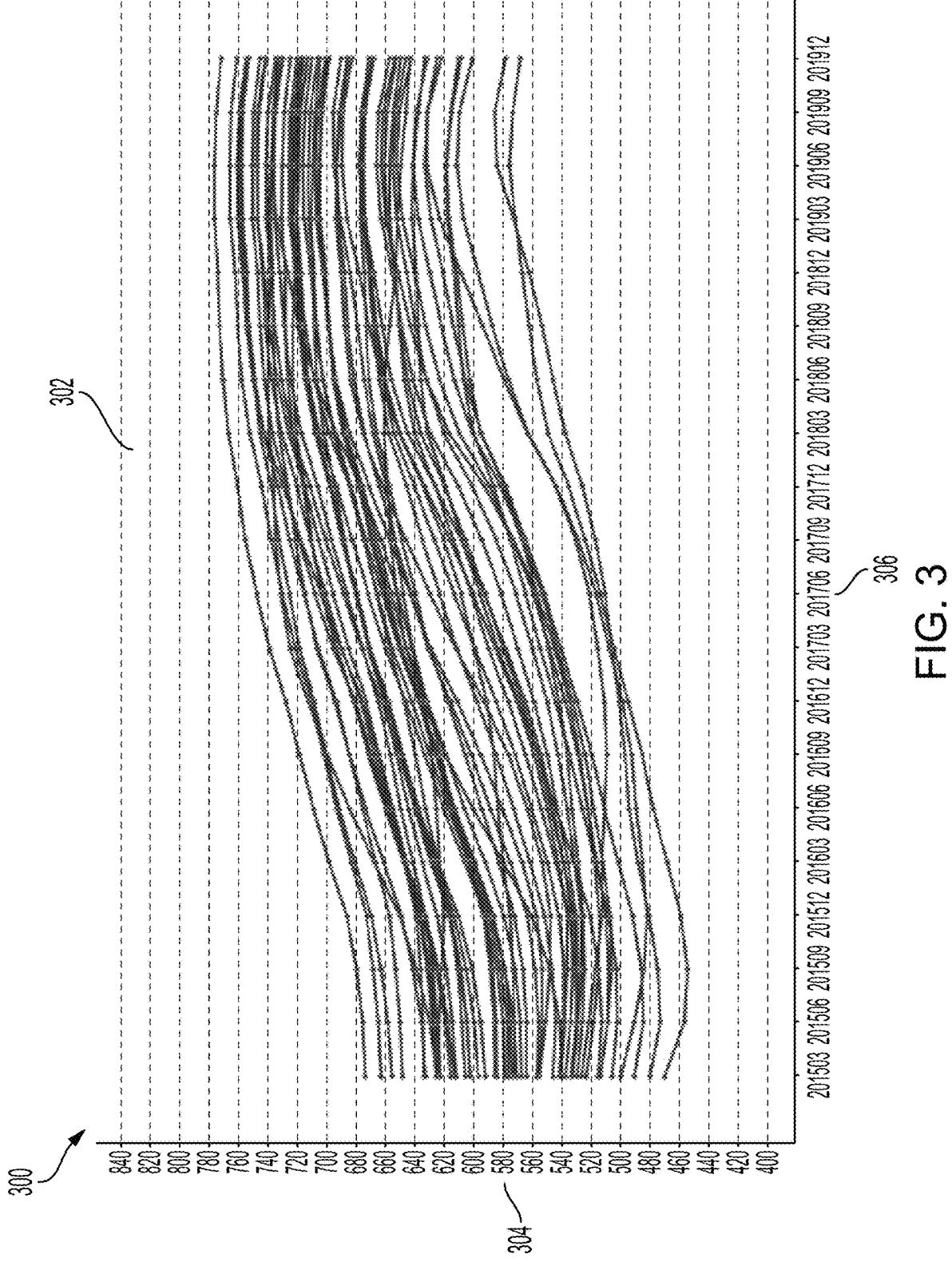
FIG. 3 is an example of a set of clusters of an increasing trend for a set of entities according to certain aspects of the present disclosure.

Referring now to FIG. 3, an example of a first set of clusters 300 of an increasing trend for a first set of entities is illustrated. As illustrated in FIG. 3, the first set of clusters 300 can include any suitable number of clusters, and the clusters can each be characterized by an increasing trend. For example, the first set of clusters 300 can indicate a final risk assessment value higher than an initial risk assessment value for a corresponding entity or corresponding group of entities. The first set of clusters 300 is illustrated on plot 302 that includes a vertical axis 304 and a horizontal axis 306. The vertical axis 304 can indicate a magnitude of the risk assessment, such as a credit score or a risk score, and the horizontal axis 306 can indicate a period of time, for example increasing time from left to right as illustrated, with respect to the risk assessment values.

Figure 4:
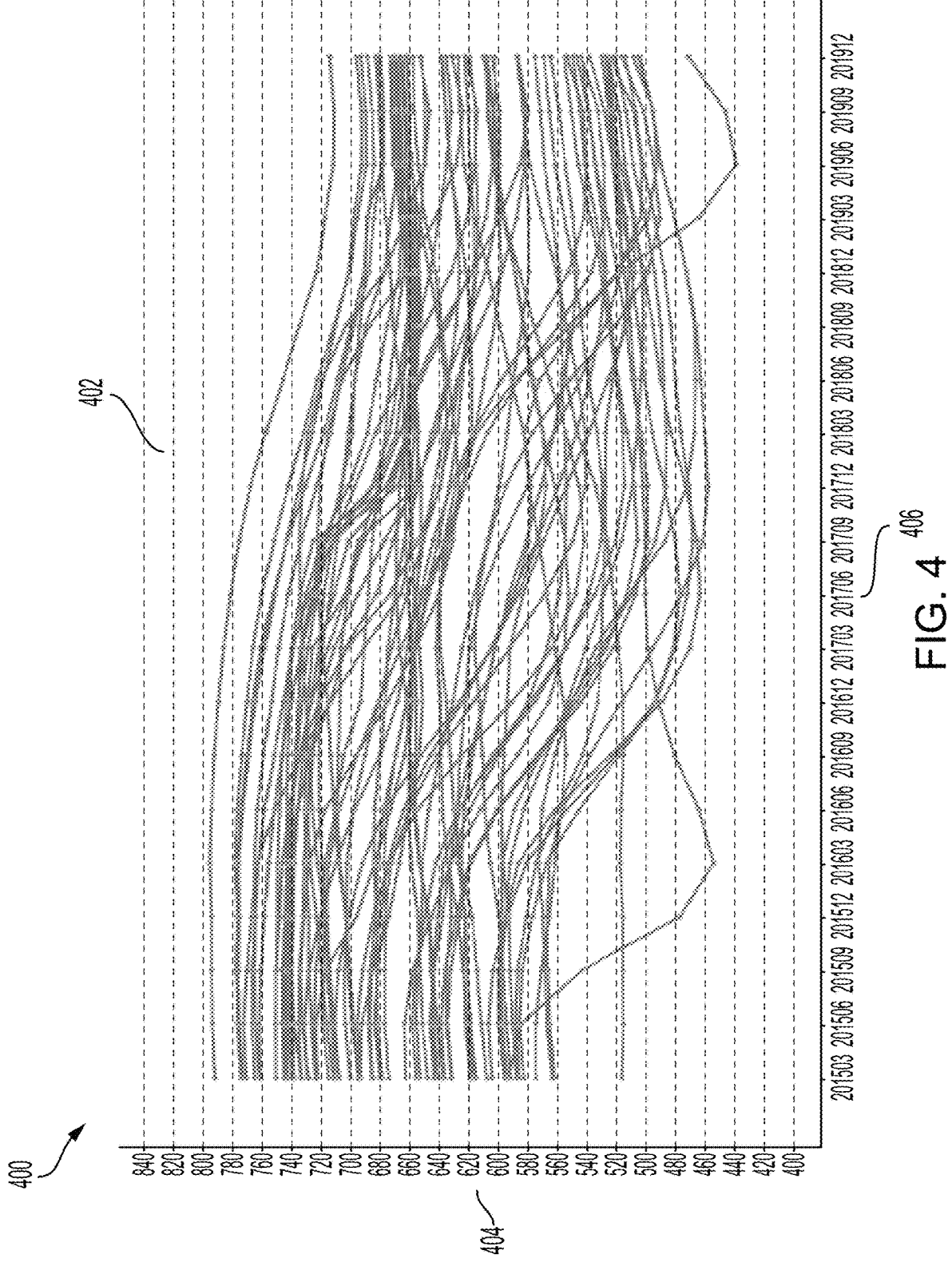
FIG. 4 is an example of a set of clusters of decreasing trend for a set of entities according to certain aspects of the present disclosure.

Referring now to FIG. 4, an example of a second set of clusters 400 of decreasing trend for a second set of entities is illustrated. As illustrated in FIG. 4, the second set of clusters 400 can include any suitable number of clusters, and the clusters can each be characterized by a decreasing trend. For example, the second set of clusters 400 can indicate a final risk assessment value lower than an initial risk assessment value for a corresponding entity or corresponding group of entities. The second set of clusters 400 is illustrated on plot 402 that includes a vertical axis 404 and a horizontal axis 406. The vertical axis 404 can indicate the magnitude of the risk assessment, such as a risk score, and the horizontal axis 406 can indicate a period of time, for example increasing time from left to right as illustrated, with respect to the risk assessment values.

Figure 5:
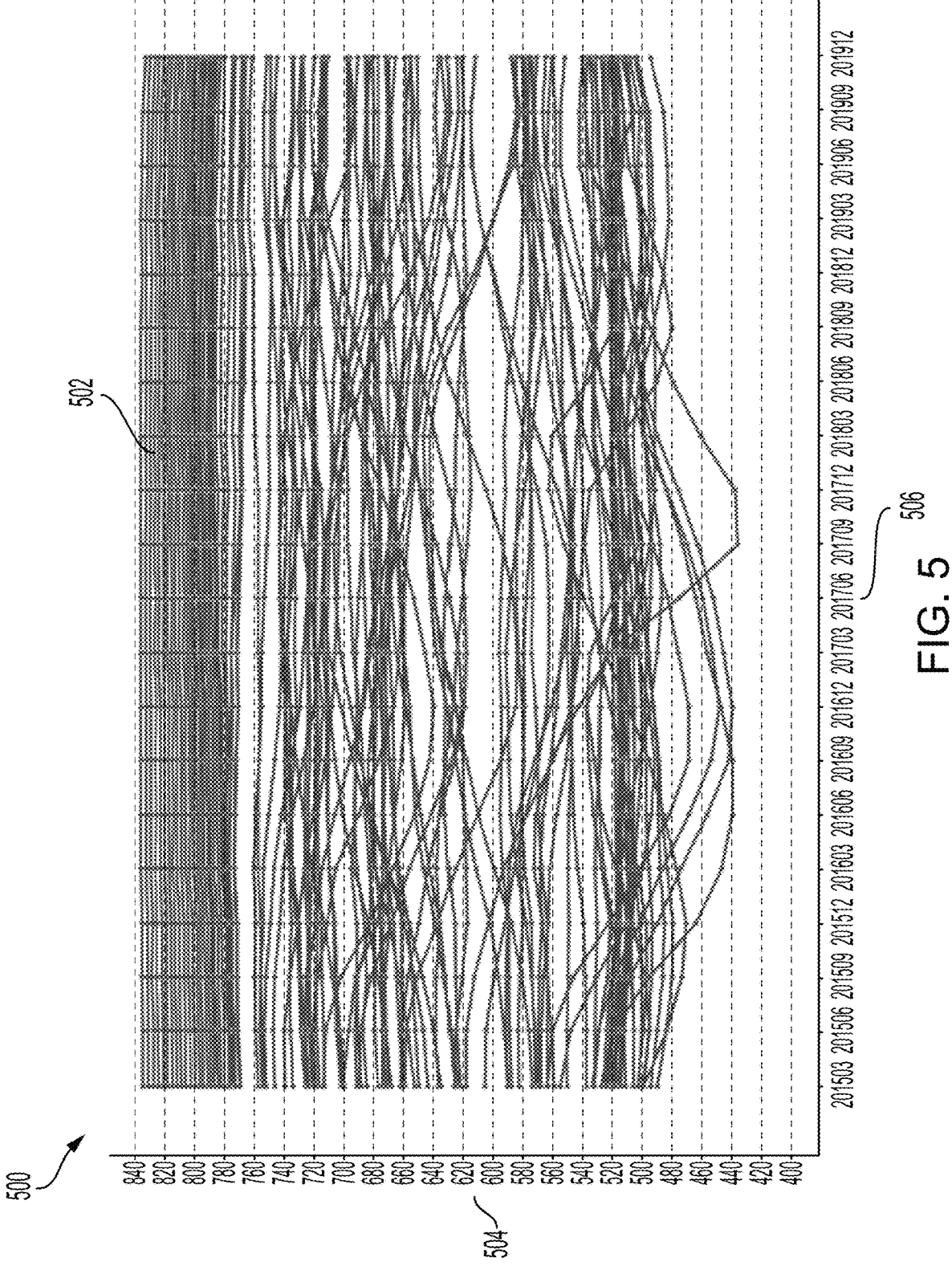
FIG. 5 is an example of a set of clusters of a stable trend for a set of entities according to certain aspects of the present disclosure.

Referring now to FIG. 5, an example of a third set of clusters 500 of a stable trend for a third set of entities is illustrated. As illustrated in FIG. 5, the third set of clusters 500 can include any suitable number of clusters, and the clusters can each be characterized by a relatively stable increasing trend. For example, the third set of clusters 500 can indicate a final risk assessment value approximately equal to an initial risk assessment value for a corresponding entity or corresponding group of entities. The third set of clusters 500 is illustrated on plot 502 that includes a vertical axis 504 and a horizontal axis 506. The vertical axis 504 can indicate the magnitude of the risk assessment, such as a risk score, and the horizontal axis 506 can indicate a period of time, for example increasing time from left to right as illustrated, with respect to the risk assessment values.

In some examples, the first set of clusters 300, the second set of clusters 400, and the third set of clusters 500 can be built or otherwise generated by the risk assessment computing system 130. For example, the first set of clusters 300, the second set of clusters 400, and the third set of clusters 500 can be built or generated by the cluster building server 110 using the historical scores 124, the clustering samples 126, other suitable data, or a combination thereof. The risk assessment computing system 130 can use high dimensional clustering or other suitable machine learning techniques to generate the sets of clusters. Each cluster included in any or each of the sets of clusters can include a set of risk assessment data that can correspond to a set of entities. For example, the set of entities can include one or more individuals in a country, and the set of risk assessment data can include risk assessment data, such as risk scores, of the individuals. Additionally, each cluster of any or all of the sets of clusters can include a subset of the risk assessment data of the individuals.

Figure 6:
FIG. 6 is an example of a center path for a target cluster according to certain aspects of the present disclosure.

Referring now to FIG. 6, an example of a center path for a target cluster 600 is illustrated. As illustrated in FIG. 6, the target cluster 600 is included on a plot 602. The plot 602 can include a vertical axis 604 and a horizontal axis 606. The vertical axis 604 can indicate a magnitude of the risk assessment, such as a risk score, and the horizontal axis 606 can indicate a period of time, for example increasing time from left to right as illustrated, with respect to the risk assessment values.

The target cluster 600 can be chosen for the target entity or can otherwise be identified by the risk assessment computing system 130 based on the trend of the target cluster 600 and the historical risk assessment values of the target entity. For example, the trend of the target cluster 600 is illustrated as slightly decreasing, which may be similar or identical to historical risk assessment values of the target entity. In some examples, the similarity in the trends between the clusters and the target entity can be measured using any of the distance metrics discussed above. The illustrated portion of the target cluster 600 can be a middle or average path, for example an average of the values, of the target cluster 600. In some examples, the risk assessment computing system 130 can use the middle path of the target cluster 600 to predict future risk assessment values for the target entity. For example, the middle path of the target cluster 600 can be used to predict risk assessment values a number of days, weeks, months, or years into the future. Alternative to the middle path, a ratio of the middle path to a path of the historical risk assessment values can be used. For example, the ratio can be multiplied by the historical risk assessment values to predict the future risk assessment values for the target entity.

The risk assessment computing system 130 can use one or more nearest neighbors of the target cluster 600 to predict the future risk assessment values. For example, a nearest neighbor cluster of the target cluster 600 may be characterized by a trend that may more accurately, compared to other trends, predict the future risk assessment values for the target entity. The risk assessment computing system 130 can perform a search or other similar or suitable function with respect to the target cluster 600 and the nearest neighbor clusters to determine a most accurate cluster to use for the prediction. The risk assessment computing system 130 can use one of the nearest neighbor clusters of the target cluster 600 or the target cluster 600 to predict the future risk assessment value for the target entity.

Figure 7:
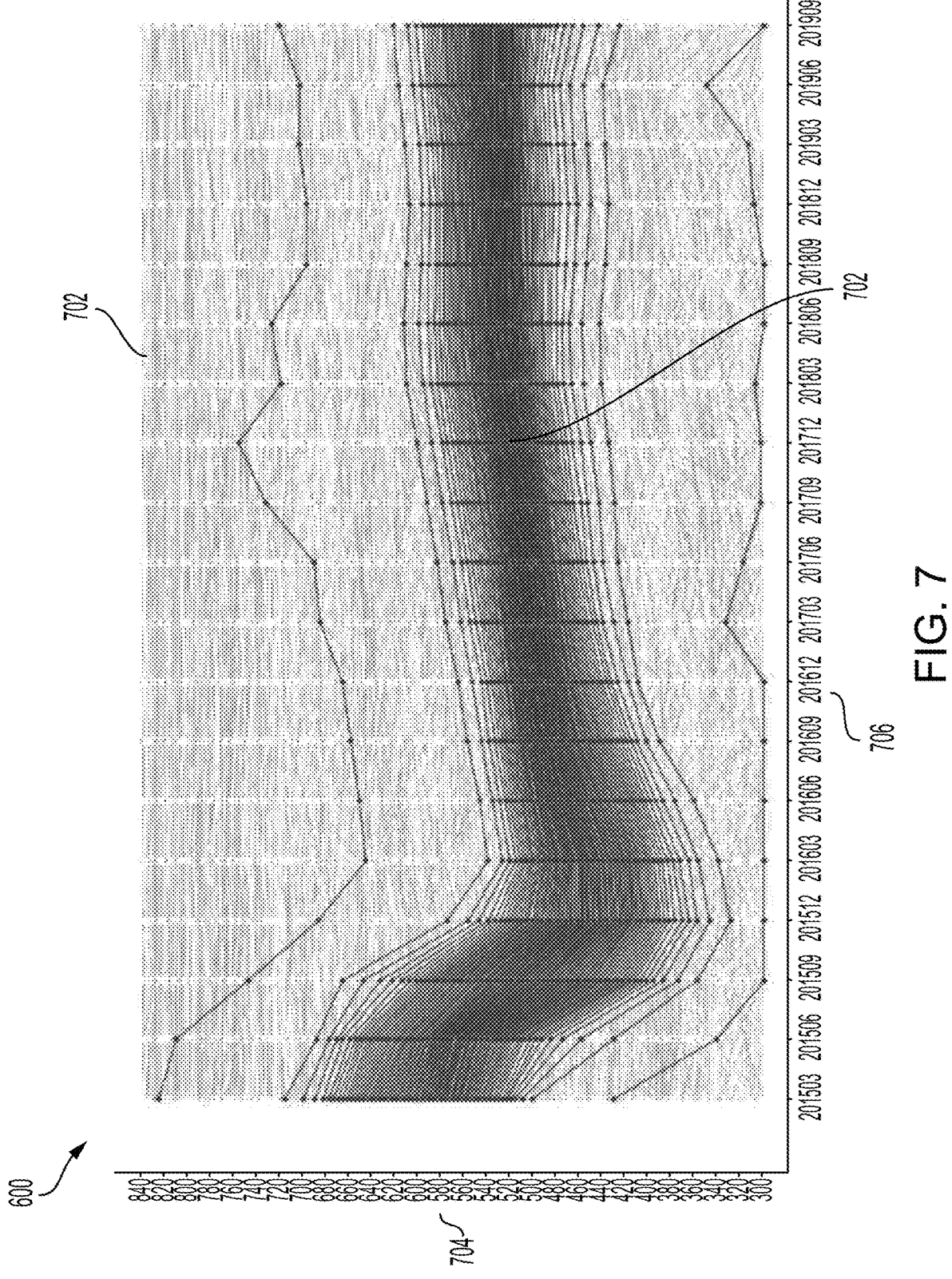
FIG. 7 is an example of a set of micro paths for a target cluster according to certain aspects of the present disclosure.

Referring now to FIG. 7, an example of a set of micro paths 700 for a target cluster 600 is presented. As illustrated in FIG. 7, the target cluster 600 can include 101 micro paths, but the target cluster 600 can be represented by any other suitable numbers, such as less than 101 or more than 101 of micro paths 700. The micro paths 700 can be characterized by a similar or identical trend compared to the trend of the middle path, which is illustrated with respect to FIG. 6, of the target cluster 600.

The risk assessment computing system 130 can determine or otherwise generate the micro paths 700 for the target cluster 600. Additionally, the risk assessment computing system 130 can determine or generate micro paths 700 for one or more nearest neighbors of the target cluster 600. If the risk assessment computing system 130 determines that the target cluster 600 best matches the historical risk assessment values of the entity, the risk assessment computing system 130 may determine or generate micro paths 700 for the target cluster 600. The risk assessment computing system 130 may subsequently determine a target micro path, which can be a micro path that best matches the historical risk assessment data of the target entity, of the micro paths 700 and can use the target micro path to predict the future risk assessment value for the target entity. Alternatively, the risk assessment computing system 130 can determine that a nearest neighbor cluster of the target cluster 600 best matches the historical risk assessment values of the target entity, and the risk assessment computing system 130 can subsequently determine micro paths 700 for the nearest neighbor cluster. The risk assessment computing system 130 can predict the future risk indicator value based on a target micro path of the micro paths 700 of the nearest neighbor cluster.

Example of Computing System

Figure 8:
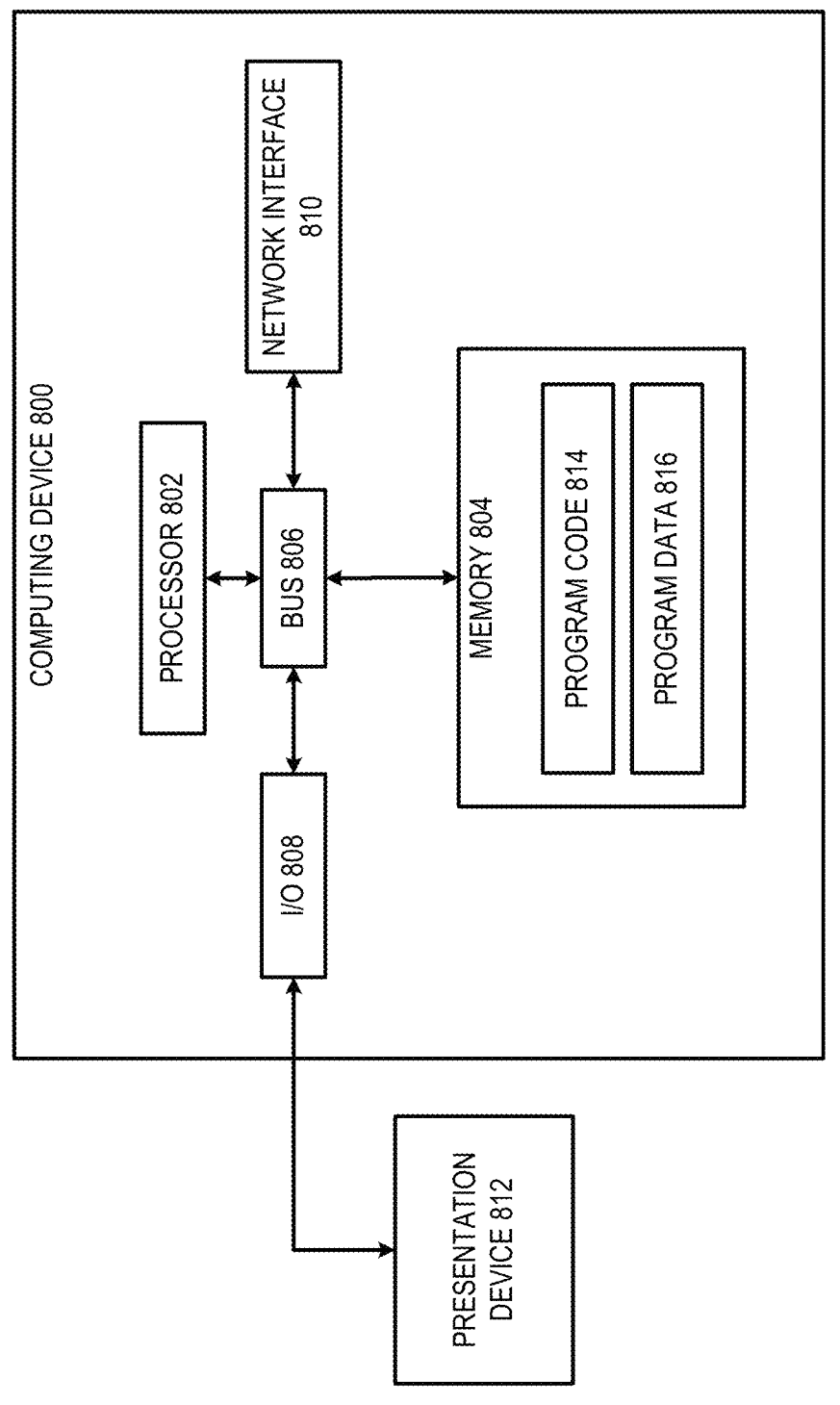
FIG. 8 is a block diagram depicting an example of a computing system suitable for implementing certain aspects of the present disclosure.

Any suitable computing system or group of computing systems can be used to perform the operations for the machine-learning operations described herein. For example, FIG. 8 is a block diagram depicting an example of a computing device 800, which can be used to implement the risk assessment server 118. The computing device 800 can include various devices for communicating with other devices in the operating environment 100, as described with respect to FIG. 1. The computing device 800 can include various devices for performing one or more clustering (or other suitable) operations described above with respect to FIGS. 1-7.

The computing device 800 can include a processor 802 that is communicatively coupled to a memory 804. The processor 802 can execute computer-executable program code stored in the memory 804, can access information stored in the memory 804, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc., may be passed, forwarded, or transmitted via any suitable means including memory sharing, message passing, token passing, network transmission, among others.

Examples of a processor 802 can include a microprocessor, an application-specific integrated circuit (ASIC), a field-programmable gate array (FPGA), or any other suitable processing device. The processor 802 can include any suitable number of processing devices, including one. The processor 802 can include or communicate with a memory 804. The memory 804 can store program code that, when executed by the processor 802, causes the processor 802 to perform the operations described herein.

The memory 804 can include any suitable non-transitory computer-readable medium. The computer-readable medium can include any electronic, optical, magnetic, or other storage device capable of providing a processor with computer-readable program code or other program code. Non-limiting examples of a computer-readable medium can include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language can include Hadoop, C, C++, C#, Visual Basic, Java, Python, Perl, JavaScript, ActionScript, etc.

The computing device 800 may also include a number of external or internal devices such as input or output devices. For example, the computing device 800 is illustrated with an input/output interface 808 that can receive input from input devices or provide output to output devices. A bus 806 can also be included in the computing device 800. The bus 806 can communicatively couple one or more components of the computing device 800.

The computing device 800 can execute program code 814 that includes the risk assessment application 114. The program code 814 for the risk assessment application 114 may be resident in any suitable computer-readable medium and may be executed on any suitable processing device. For example, as depicted in FIG. 8, the program code 814 for the risk assessment application 114 can reside in the memory 804 at the computing device 800 along with the program data 816 associated with the program code 814, such as the historical scores 124. Executing the risk assessment application 114 can configure the processor 802 to perform the operations described herein.

In some aspects, the computing device 800 can include one or more output devices. One example of an output device can be the network interface device 810 depicted in FIG. 8. A network interface device 810 can include any device or group of devices suitable for establishing a wired or wireless data connection to one or more data networks described herein. Non-limiting examples of the network interface device 810 can include an Ethernet network adapter, a modem, etc.

Another example of an output device can include the presentation device 812 depicted in FIG. 8. A presentation device 812 can include any device or group of devices suitable for providing visual, auditory, or other suitable sensory output. Non-limiting examples of the presentation device 812 can include a touchscreen, a monitor, a speaker, a separate mobile computing device, etc. In some aspects, the presentation device 812 can include a remote client-computing device that communicates with the computing device 800 using one or more data networks described herein. In other aspects, the presentation device 812 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:
1. A method comprising:
  receiving, by a processing device, historical risk assessment data of a target entity;
  identifying, by the processing device, a target cluster out of a plurality of clusters, the target cluster matching the historical risk assessment data of the target entity, wherein the plurality of clusters are determined based on risk assessment data of a plurality of entities using high dimensional clustering;

identifying, by the processing device and from the plurality of clusters, a set of nearest neighboring clusters of the target cluster;

determining, by the processing device, a prediction of risk for the target entity based on the target cluster and the set of nearest neighboring clusters; and transmitting, by the processing device and to a remote computing device, a responsive message including at least the prediction of risk for use in controlling access of the target entity to one or more interactive computing environments.

2. The method of claim 1, wherein determining the prediction of risk for the target entity comprises determining, by the processing device, the prediction of risk using a center path of the target cluster of the plurality of clusters.

3. The method of claim 1, wherein the target cluster of the plurality of clusters includes a plurality of micro paths, and wherein determining the prediction of risk for the target entity comprises determining the prediction of risk using a micro path of the plurality of micro paths.

4. The method of claim 3, wherein the historical risk assessment data comprises historical risk indicator data, and wherein determining the prediction of risk using the micro path comprises:

identifying, among the target cluster and the set of nearest neighboring clusters, a plurality of micro paths;

determining that a particular micro path of the plurality of micro paths has the smallest distance to the historical risk indicator data; and determining the prediction of risk using the particular micro path.

5. The method of claim 3, wherein each micro path of the plurality of micro paths comprises a plurality of percentile paths, wherein each percentile path of the plurality of percentile paths follows a trend of risk indicator values of a particular percentile of the plurality of entities, and wherein the method further comprises:

determining, by the processing device, a particular percentile path of the plurality of percentile paths that has the smallest distance with respect to the risk indicator values.

6. The method of claim 5, wherein determining the prediction of risk using the micro path comprises determining the prediction of risk using the particular percentile path of the plurality of percentile paths.

7. The method of claim 1, wherein identifying the target cluster of the plurality of clusters comprises:

determining a plurality of distances, the plurality of distances measuring respective distances between the plurality of clusters and the historical risk assessment data;

determining that a distance between a particular cluster and the historical risk assessment data is a smallest distance among the plurality of distances; and determining the particular cluster as the target cluster.

8. A system comprising:

a processor; and a non-transitory computer-readable medium comprising instructions that are executable by the processor to cause the processor to perform operations comprising:

receiving historical risk assessment data of a target entity;

identifying a target cluster out of a plurality of clusters, the target cluster matching the historical risk assessment data of the target entity, wherein the plurality of clusters are determined based on risk assessment data of a plurality of entities using high dimensional clustering;

identifying, from the plurality of clusters, a set of nearest neighboring clusters of the target cluster;

determining a prediction of risk for the target entity based on the target cluster and the set of nearest neighboring clusters; and transmitting, to a remote computing device, a responsive message including at least the prediction of risk for use in controlling access of the target entity to one or more interactive computing environments.

9. The system of claim 8, wherein the operation of determining the prediction of risk for the target entity comprises determining the prediction of risk using a center path of the target cluster of the plurality of clusters.

10. The system of claim 8, wherein the target cluster of the plurality of clusters includes a plurality of micro paths, and wherein the operation of determining the prediction of risk for the target entity comprises determining the prediction of risk using a micro path of the plurality of micro paths.

11. The system of claim 10, wherein the historical risk assessment data comprises historical risk indicator data, and wherein the operation of determining the prediction of risk using the micro path comprises:

identifying, among the target cluster and the set of nearest neighboring clusters, a plurality of micro paths;

determining that a particular micro path of the plurality of micro paths has the smallest distance to the historical risk indicator data; and determining the prediction of risk using the particular micro path.

12. The system of claim 10, wherein each micro path of the plurality of micro paths comprises a plurality of percentile paths, wherein each percentile path of the plurality of percentile paths follows a trend of risk indicator values of a particular percentile of the plurality of entities, and wherein the operations further comprise:

determining a particular percentile path of the plurality of percentile paths that has the smallest distance with respect to the risk indicator values.

13. The system of claim 12, wherein the operation of determining the prediction of risk using the micro path comprises determining the prediction of risk using the particular percentile path of the plurality of percentile paths.

14. The system of claim 8, wherein the operation of identifying the target cluster of the plurality of clusters comprises:

determining a plurality of distances, the plurality of distances measuring respective distances between the plurality of clusters and the historical risk assessment data;

determining that a distance between a particular cluster and the historical risk assessment data is a smallest distance among the plurality of distances; and determining the particular cluster as the target cluster.

15. A non-transitory computer-readable medium comprising instructions that are executable by a processing device for causing the processing device to perform operations comprising:

receiving historical risk assessment data of a target entity;

identifying a target cluster out of a plurality of clusters, the target cluster matching the historical risk assessment data of the target entity, wherein the plurality of clusters are determined based on risk assessment data of a plurality of entities using high dimensional clustering;

identifying, from the plurality of clusters, a set of nearest neighboring clusters of the target cluster;

determining a prediction of risk for the target entity based on the target cluster and the set of nearest neighboring clusters; and transmitting, to a remote computing device, a responsive message including at least the prediction of risk for use in controlling access of the target entity to one or more interactive computing environments.

16. The non-transitory computer-readable medium of claim 15, wherein the operation of determining the prediction of risk for the target entity comprises determining the prediction of risk using a center path of the target cluster of the plurality of clusters.

17. The non-transitory computer-readable medium of claim 15, wherein the target cluster of the plurality of clusters includes a plurality of micro paths, and wherein the operation of determining the prediction of risk for the target entity comprises determining the prediction of risk using a micro path of the plurality of micro paths.

18. The non-transitory computer-readable medium of claim 17, wherein the historical risk assessment data comprises historical risk indicator data, and wherein the operation of determining the prediction of risk using the micro path comprises:

identifying, among the target cluster and the set of nearest neighboring clusters, a plurality of micro paths;

determining that a particular micro path of the plurality of micro paths has the smallest distance to the historical risk indicator data; and determining the prediction of risk using the particular micro path.

19. The non-transitory computer-readable medium of claim 17, wherein each micro path of the plurality of micro paths comprises a plurality of percentile paths, wherein each percentile path of the plurality of percentile paths follows a trend of risk indicator values of a particular percentile of the plurality of entities, and wherein the operations further comprise:

determining, by the processing device, a particular percentile path of the plurality of percentile paths that has the smallest distance with respect to the risk indicator values; and determining the prediction of risk using the particular percentile path of the plurality of percentile paths.

20. The non-transitory computer-readable medium of claim 15, wherein the operation of identifying the target cluster of the plurality of clusters comprises:

determining a plurality of distances, the plurality of distances measuring respective distances between the plurality of clusters and the historical risk assessment data;

determining that a distance between a particular cluster and the historical risk assessment data is a smallest distance among the plurality of distances; and determining the particular cluster as the target cluster.

\* \* \* \* \*